United States Patent
Brooks et al.

(10) Patent No.: US 11,750,660 B2
(45) Date of Patent: *Sep. 5, 2023

(54) DYNAMICALLY UPDATING RULES FOR DETECTING COMPROMISED DEVICES

(71) Applicant: VMware, Inc., Palo Alto, CA (US)

(72) Inventors: Simon Brooks, Palo Alto, CA (US); Daniel E. Zeck, Roswell, GA (US); Xinpi Du, Atlanta, GA (US); Ali Mohsin, Alpharetta, GA (US); Kishore Sajja, Atlanta, GA (US); Nikhil Mehta, Atlanta, GA (US)

(73) Assignee: VMware, INC., Palo Alto, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/470,711

(22) Filed: Sep. 9, 2021

(65) Prior Publication Data
US 2021/0409452 A1   Dec. 30, 2021

Related U.S. Application Data

(63) Continuation of application No. 16/134,542, filed on Sep. 18, 2018, now Pat. No. 11,128,666.

(51) Int. Cl.
| | |
|---|---|
| H04L 29/06 | (2006.01) |
| H04L 9/40 | (2022.01) |
| G06F 9/54 | (2006.01) |
| G06F 21/55 | (2013.01) |

(52) U.S. Cl.
CPC .............. *H04L 63/20* (2013.01); *G06F 9/542* (2013.01); *G06F 21/552* (2013.01); *G06F 21/554* (2013.01)

(58) Field of Classification Search
CPC ....... H04L 63/20; G06F 9/542; G06F 21/552; G06F 21/554
See application file for complete search history.

(56) References Cited

U.S. PATENT DOCUMENTS

| | | | |
|---|---|---|---|
| 2006/0021005 A1* | 1/2006 | Williams | G06F 21/313 726/2 |
| 2018/0060569 A1* | 3/2018 | Kim | G06F 21/566 |

FOREIGN PATENT DOCUMENTS

CA   2835933 A1   6/2014

* cited by examiner

*Primary Examiner* — Evans Desrosiers
(74) *Attorney, Agent, or Firm* — Thomas | Horstemeyer, LLP

(57) ABSTRACT

Examples for detecting a compromised device are described. A set of threat detection rules can instruct an application on the client device how to detect whether the client device is compromised. The rules can be updated dynamically and without updating the application that is performing the compromise detection. The rules can be encoded in an interpreted scripting language and executed by a runtime environment that is embedded within the application.

17 Claims, 4 Drawing Sheets

DYNAMICALLY UPDATING RULES FOR DETECTING COMPROMISED DEVICES

CROSS-REFERENCE TO RELATED APPLICATIONS

This application is a continuation of and claims the benefit of U.S. patent application Ser. No. 16/134,542, entitled "DYNAMICALLY UPDATING RULES FOR DETECTING COMPROMISED DEVICES," and filed Sep. 18, 2018, which is hereby incorporated by reference in its entirety.

BACKGROUND

With the emergence of mobile devices in enterprise environments, administrators of an enterprise technology infrastructure face constantly changing security threats to the mobile devices of their users. In some cases, bring-your-own-device (BYOD) policies of an enterprise permit employees or other personnel to use their own devices for business purposes. Devices can be used to access enterprise data, such as email and corporate documents. Accordingly, the enterprise can wish to determine whether the device has been compromised or altered in a manner that conflicts with the information technology policies of the organization. For example, an enterprise can establish policies whereby a device that has been rooted is not authorized to execute a particular application or access particular resources that are provided by the enterprise.

However, the ways in which a device can be compromised or the ways in which detection of a compromised device is performed can constantly change. For example, as the operating system of a device is updated, the way in which root detection is performed can change. Additionally, the enterprise can wish to detect other modifications to the software or configuration of a mobile device that are not related to root detection. For example, if one or more files have been modified, moved, or deleted, the enterprise can wish to designate the mobile device as compromised and take a remedial action. Therefore, because compromise detection of a mobile device is an ever-changing process, a mechanism to detect device compromise should also be a dynamic process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
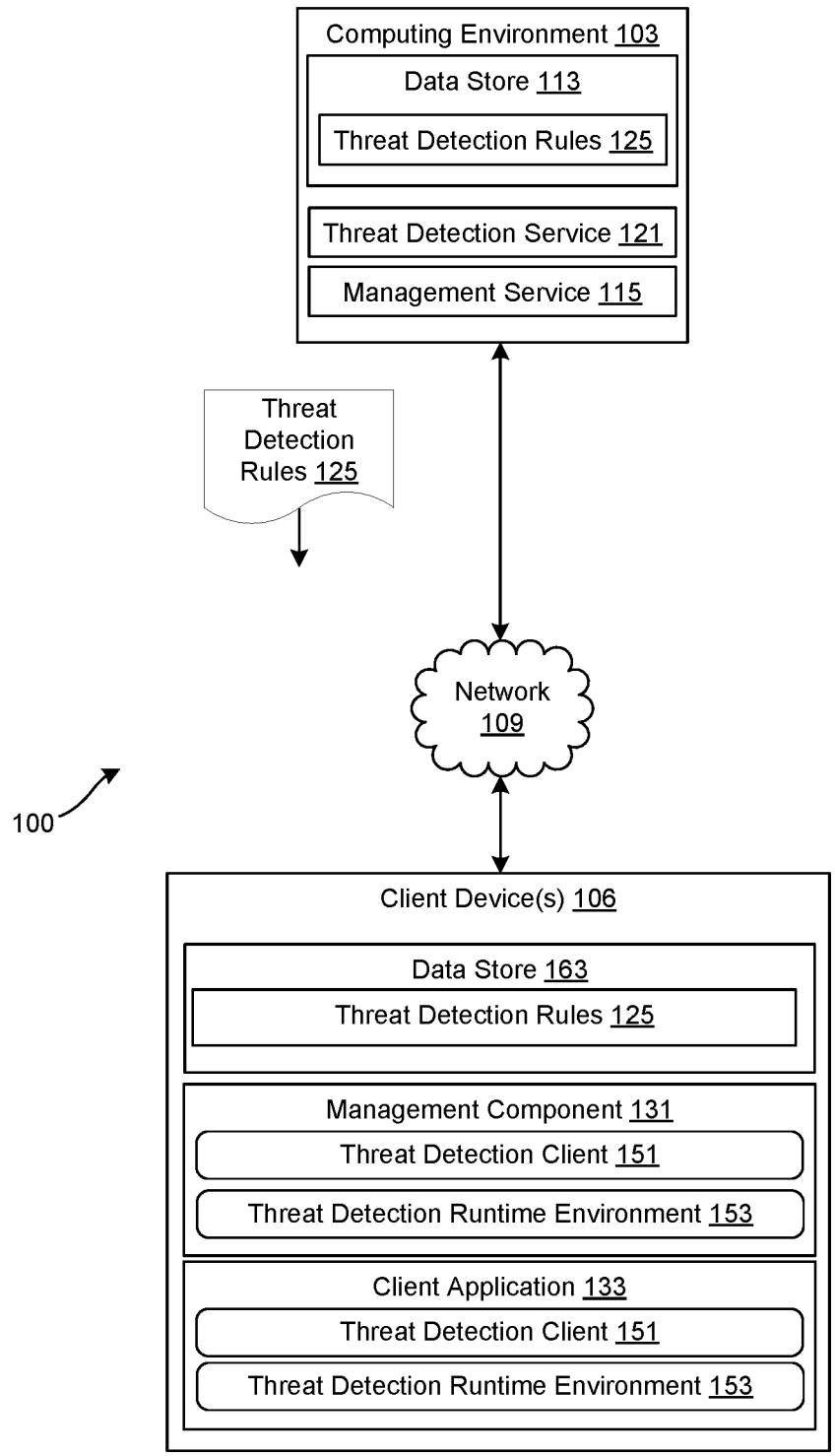
FIG. 1 is a drawing of a networked environment that includes a computing environment and one or more client devices.

The present disclosure relates to dynamically updating threat detection rules that are used by applications on a mobile device, or a client device, to detect whether the device has been compromised or modified in a manner that conflicts with an enterprise policy. A software development kit (SDK) can include libraries that can determine whether a client device has been compromised. According to examples of this disclosure, the libraries can be included within an application that is made using the SDK. The libraries include rules that detect a compromised device and can be dynamically updated without updating the application itself.

An example of a device that is compromised is one that has been rooted. In this scenario, the end-user of the device may not be given root access to the operating system by default. Root or superuser access can be reserved for an administrator account or to no user accounts of the device in the case of some mobile device operating systems. If the user has hacked, jailbroken, or otherwise compromised the device such that a user account on the device has root access, the device can be considered compromised.

If a particular file located on the client device has been removed, modified, or moved from its expected location, the device can also be considered compromised. For example, the hosts file on the device for a particular operating system can have an expected hash value, a modified date, a file size, or other properties. Should the properties of the hosts file vary from an expected value, the device can be considered compromised.

Accordingly, because the operating system and other properties of a client device can vary depending on a version of the device, the operating system, a model of the device, the manufacturer of the device, or whether the device is enrolled as a managed device, the rules or mechanisms used to detect whether the device is compromised can vary widely. Additionally, the rules to detect a compromised device can change over time as the operating system, applications, profiles, and other data stored on the device changes or is updated over time. Therefore, a need to dynamically update the rules for detecting a compromised device exists.

According to examples of this disclosure, dynamic updating of threat detection rules can be performed without updating the application binary in which the SDK functionality is embedded. Therefore, the threat detection rules can be updated at any time without rolling out an application update. Additionally, because the threat detection functionality can be embedded within libraries provided in a particular SDK, any application made using the SDK and incorporating the appropriate libraries can also be embedded with threat detection capabilities. In this way, whether the device is enrolled with a management service as a managed device or not, an enterprise can provide threat detection capabilities by merely installing an application on the device. The application can be installed by or on behalf of a user to which the device is issued.

Rather than embedding threat detection rules within the libraries of an SDK that are embedded into an application that is made using the SDK, examples of the disclosure execute a threat detection client and a threat detection runtime environment within an application made using the SDK. The threat detection client can obtain or update threat detection rules from a remotely executed threat detection service. The threat detection runtime environment can utilize the threat detection rules obtained by the threat detection client to determine whether a particular client device has been compromised. These rules can be subsequently updated by the threat detection client without updating the application.

With reference to FIG. 1, shown is an example of a networked environment 100. The networked environment 100 can include a computing environment 103 and one or more client devices 106 in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include wireless networks, satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement.

The computing devices can be located in a single installation or can be distributed among many different geographical locations. The computing environments 103 can also include or be operated as one or more virtualized computer instances. For purposes of convenience, the computing environment 103 is referred to herein in the singular, although it is understood that a plurality of computing environments 103 can be used. As the computing environment 103 communicates with the client devices 106 remotely over the network 109, the computing environment 103 can be described as a "remote" or a "cloud" computing environment 103.

The computing environment 103 can include a data store 113. The data store 113 can include memory of the computing environment 103, mass storage resources of the computing environment 103, or any other storage resources on which data can be stored by the computing environment 103. The data store 113 can include one or more databases, such as a structured query language (SQL) database, a non-SQL database, or other appropriate database. The data stored in the data store 113, for example, can be associated with the operation of the various applications or functional entities described below.

The components executed on the computing environment 103 can include, for example, the management service 115, the threat detection service 121, as well as other applications, services, processes, systems, engines, or functionality not discussed in detail herein. The management service 115 can oversee the operation of client devices 106 enrolled as managed devices with the management service 115. In some embodiments, an entity, such as one or more enterprises, companies, or other organizations, can operate the management service 115 to oversee or manage the operation of the client devices 106 of its employees, contractors, customers, or other users having an account with the management service 115.

The management service 115 can install various software components on a client device 106. For example, the management service 115 can install client applications 133, resources, libraries, drivers, configuration profiles, or other components on the client device 106 as specified by an administrator of the management service 115. The management service 115 can also cause policies to be implemented on a client device 106. Policies can include restrictions or permissions pertaining to capabilities of a client device 106 that can pertain to accessing enterprise data on the client device 106.

The management service 115 can interact with one or more client applications 133 executed on the client device 106 to perform management functions. In one example, the management service 115 can interact with a management component 131 on the client device 106, which can carry out various management functions on behalf of the management service 15 on the client device. The management component 131 can be installed when the client device 106 is enrolled as a managed device with the management service 115. When enrolled, the management component 131 can be registered as a device administrator of the client device 106, which can provide the management component 131 with sufficient privileges to control the operation of the client device 106. In one example, the management component 131 can be registered as the device administrator through the installation of a management profile that causes the operating system to designate the management component 131 as the device administrator.

The management service 115 can direct the management component 131 to perform various device management functions on the client device 106. For example, the management service 115 can direct the management component 131 to control access to certain software or hardware functions available on the client device 106. As a result, the management service 115 can verify that the configuration and operation of the client device 106 conforms with predefined criteria that ensures that data on the client device 106 is protected from data loss, unauthorized access, or other harmful events.

The management service 115 can also instruct the management component 131 to install other client applications 133 that can provide other capabilities for the user. For example, a client application 133 can include a productivity application, a communication application, a security application, or any other application designated by an administrator as necessary or useful to a user of the device. In one scenario, the management component 131 can install client applications 133 on the device on behalf of the user. In other scenarios, a user can download and install a particular client application 133 on the client device 106 without intervention from the management component 131.

The data stored in the data store 113 can include, for example, threat detection rules 125. In some implementations, the data store 113 can also house data that facilitates operation of the management service 115, such as user account data, device profiles, and compliance rules. User account data can include information pertaining to end users of the client devices 106 enrolled with the management service 115. For instance, user account data can include data used to authenticate an end user, such as a username, password, email address, biometric data, device identifier, registry identifier, or other data.

The device profiles include data describing a current configuration of a client device 106. The data describing the device can include an operating system, operating system version, device manufacturer, and/or hardware features of the client device 106. The device data can be used by the threat detection service 121 to identify an appropriate set of threat detection rules to deploy to a particular client device 106. The management service 115 communicates with the management component 131 or other client application 133 to determine whether vulnerabilities exist according to threat detection rules 125. Device data can include, for example, data pertaining to an enrollment status for a client device 106. In one example, a client device 106 for an end user designated as "enrolled" can have a varying set of threat detection rules 125 from a device that is designated as "not enrolled."

In some examples, device data can include device identifiers. Device identifiers can include a string of alphanumeric characters, or other characters and symbols, capable of uniquely identifying a client device 106. In some examples, the device identifiers include unique device identifiers (UDIDs). Threat detection rules 125 can be associated with a particular device or at least a category of devices that are associated with the management service 115.

Threat detection rules 125 can specify how a client device 106 can be designated as compromised. A threat detection rule 125 can be defined by an administrator and identify an expected condition on the client device 106 that should be present on a client device 106. Should the expected condition not be present, the client device 106 can be designated as compromised. For example, the threat detection rule 125 can specify that a certain file should be present in a particular storage location and have specific properties, such as file size, a file hash, or a modified date. If the file is not present in an expected condition, the client device 106 can be deemed compromised.

A threat detection rule 125 can also identify a condition that, if present, can cause the client device 106 to be deemed as compromised. For example, if a particular file has a particular attribute, such as a read or write permission, the device can be deemed compromised. As one example, the threat detection rule 125 can specify that if a file such as "Superuser.apk" is present on an Android device in a directory where applications are stored, the client device 106 is compromised.

As another example, the threat detection rule 125 can specify that the device can be deemed compromised if the value of a system property is different from an expected value. The operating system version, kernel version, date and time properties, user properties, such as whether the current user is an administrator or root user, a list of currently installed or running applications, and a certificate signature of an installed certificate are examples of system properties on which a threat detection rule 125 can be based.

A threat detection rule 125 can specify a particular shell command and an expected result of the shell command that determines whether the client device 106 is compromised or not. The shell command can execute a command that obtains file properties, system properties, user properties, and combinations thereof. The shell command can also execute a command line utility for searching the result of a shell command for text that matches a particular regular expression, such as "grep." The threat detection rule 125 can specify whether and which result of such a shell command means the client device 106 is compromised.

Threat detection rules 125 can be defined as event handlers that listen for a particular event triggered on the client device 106. For example, a rule specifying a particular outcome of a shell command can be defined as an event handler that listens for the result or command line output of executing a shell command. When the shell command is executed, logic on the client device 106 can evaluate the result of the command.

The threat detection service 121 can update client devices with threat detection rules 125 that are applicable to a device type and operating system that matches the client device 106. The threat detection service 121 can provide threat detection rules 125 to the client device 106 over the network 109. The threat detection rules 125 can be signed by the threat detection service 121 so that the client device 106 can validate the source of the rules. Additionally, the threat detection rules 125 can be defined in a language that can be interpreted and executed by a runtime environment on the client device 106, such as JavaScript or WebAssembly. In this way, the threat detection rules 125 can be updated without updating the underlying application binary that executes the runtime environment that executes the threat detection rules 125.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system that runs a management component 131 and various client applications 133. The management component 131 can be a portion of the operating system or a standalone component that manages the client device 106 on behalf of the management service 115. The management component 131 can enforce compliance rules and policies, install configuration profiles, and perform other management actions on the client device 106 on behalf of the remotely executed management service 115.

In some examples, at least a portion of the client applications 133 are "managed applications" where the management service 115 can oversee or control operation of the client applications 133. For instance, using an administrator console, an administrator of the management service 115 can distribute, secure, and track client applications 133 installed on client devices 106 enrolled with the management service 115.

The client data store 163 can store data associated with the operating system and various applications that are installed on the client device 106. In one example, the data store 163 can separate storage areas for the various applications into application-restricted storage. In this scenario, a client application 133 can store files that are inaccessible by other applications installed on the client device 106. In another scenario, the data store 163 can store data that is signed by a particular developer signature such that all applications signed by a developer certificate can access a particular storage area of the data store 163 assigned to the developer certificate. The client data store 163 can contain threat detection rules 125 that are obtained from the remotely executed threat detection service 121 over the network 109.

The threat detection rules 125 can be stored in the client data store 163 in a storage area that is restricted to the management component 131 or client applications 133 that have the threat detection client 151 and threat detection runtime environment 153. In some cases, each client application 133 or management component 131 can store its own copy of the threat detection rules 125. In other implementations, the client applications 133 and management component 131 can share a copy of the threat detection rules 125.

According to examples of this disclosure, the management component 131 can be instrumented with a threat detection client 151 and a threat detection runtime environment 153. Certain client applications 133 that are created using a particular SDK that includes threat detection libraries according to this disclosure can also be instrumented with the threat detection client 151 and threat detection runtime environment 153. Other applications that are not made using the SDK with threat detection libraries do not have a threat detection client 151 and threat detection runtime environment 153.

The threat detection client 151 and threat detection runtime environment 153 can be implemented as functionality within the management component 131 and client application 133, respectively. In one implementation, the threat detection client 151 can be implemented in code that is native to the client device 106. For example, in the case of an iOS® device, the threat detection client 151 can be implemented in Swift and compiled into native iOS code along with the client application 133 using the SDK. In the case of an Android device, the threat detection client 151 can be implemented in Kotlin and compiled into machine executable code on an Android device. Because the threat detection client 151 can be implemented in native code, it can be instrumented with access to functionality of the operating system such as shell commands. These shell commands can return information about files stored on the client device 106 and system properties of the client device 106. By extracting information about files stored on the client device 106 and system properties, conditions associated with a compromised device can be detected.

The threat detection runtime environment 153 can be implemented as a JavaScript or WebAssembly runtime environment that can interpret and execute the threat detection rules 125 obtained from the threat detection service 121. In this scenario, the threat detection rules 125 can be encoded in JavaScript or WebAssembly. A threat detection rule 125 can specify how a compromised state of a client device 106 can be detected. The threat detection rule 125 can also specify a remedial action that should be taken in response to detecting a compromised state. In some implementations, the threat detection runtime environment 153 can detect the compromised state and then instruct the threat detection runtime environment 153, which can be implemented in native code, what remedial action should be taken on the client device 106.

Figure 2:
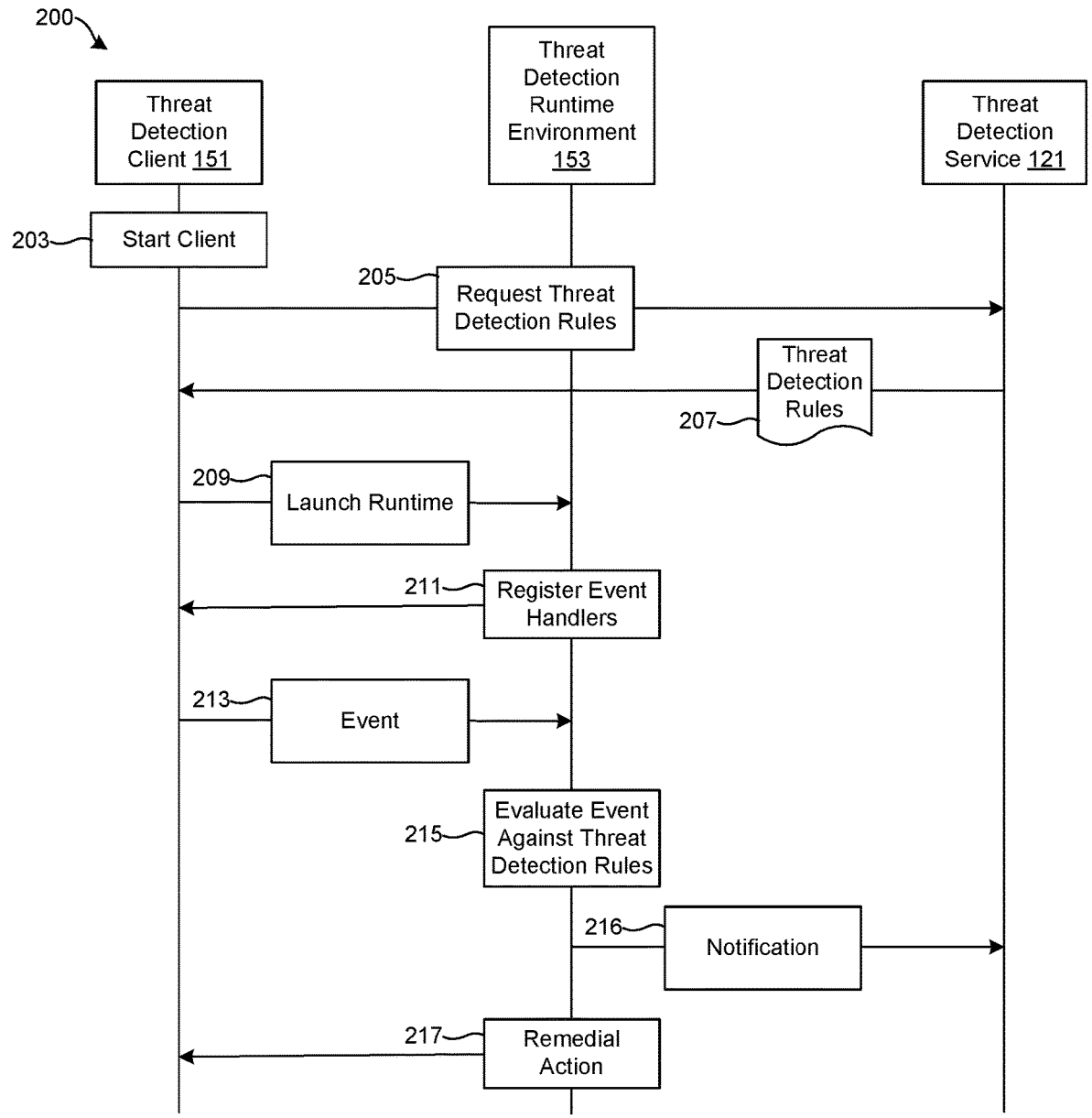
FIG. 2 is a sequence diagram illustrating functionality implemented by components of the networked environment.

Referring next to FIG. 2, a sequence diagram 200 is shown illustrating functionality implemented by components of the networked environment 100. The sequence diagram 200 of FIG. 2 illustrates how the threat detection client 151 and threat detection runtime environment 153 within a client application 133 or the management component 131 can determine whether a client device 106 is in a compromised state. Beginning with step 203, the threat detection client 151 can startup. The threat detection client 151 can startup upon launch or foregrounding of a management component 131 or client application 133 in which the threat detection client 151 is implemented. In some mobile operating environments, background execution of services or processes can be limited, so the threat detection client 151 can be instrumented to launch upon startup or foregrounding of the application in which it is implemented.

In some implementations, the threat detection client 151 can launch when an application launches, restores from a sleep state, upon expiration of a timer, occurrence of an event in the operating system, or any other trigger point that can be defined by the threat detection rules 125 or instrumented within the threat detection client 151.

At step 205, the threat detection client 151 can request threat detection rules 125 from the threat detection service 121. The threat detection client 151 can authenticate the client device 106 or the user associated with the client device 106. In some instances, the threat detection service 121 can select a particular set of threat detection rules 125 based upon a device identifier, a device type, operating system, or an identity of the user. For example, the threat detection service 121 can allow two enterprises to have different rules for what constitutes a compromised device. Additionally, in some cases, the threat detection client 151 can determine that up-to-date threat detection rules 125 might already be stored on the client device 106 and skip step 205.

At step 207, the threat detection service 121 can transmit the threat detection rules 125 to the threat detection client 151. The threat detection service 121 can sign the threat detection rules 125 with a certificate that can be validated by the threat detection client 151. The threat detection service 151 can encrypt or hash the threat detection rules 125 with a key or hash function that can be decrypted or decoded by the threat detection client 151. The threat detection rules 125 can be encoded in an interpreted programming language such as JavaScript or WebAssembly that can be interpreted by the threat detection runtime environment 153 on the client device 106. The threat detection client 151 can store the threat detection rules 125 on the client device 106 to be used for subsequent execution of the client application 133 or management component 131.

At step 209, the threat detection client 151 can launch the threat detection runtime environment 153. The threat detection runtime environment 153 can be a runtime environment that can process and execute the threat detection rules 125 on the client device 106. The threat detection runtime environment 153 can be implemented within the client application 133 or management component 131 that executed the threat detection client 151.

At step 211, the threat detection runtime environment 153 can register one or more event handlers corresponding to rules defined within the threat detection rules 125. Threat detection rules 125 can be implemented as event handlers within the threat detection runtime environment 153 that listen for events triggered by the threat detection client 151. For example, a particular threat detection rule 125 can specify that a device is compromised if a particular file is not present. The threat detection runtime environment 153 can register an event handler that listens for a result of a shell command executed on the client device 106 that requests properties of the file.

Upon registering the event handler within the threat detection runtime environment 153, the threat detection runtime environment 153 can cause a shell command to execute the threat detection client 151. In some instances, the shell command specified by a threat detection rule 125 can be an operating system command that obtains a property of a file stored on the client device 106. The shell command can also obtain a system property of the client device 106. The operating system command can be inaccessible from the threat detection runtime environment 153 but accessible to the threat detection client 151 because the threat detection client 151 can be implemented in native code that has access to operating system shell commands.

Because the threat detection client 151 is implemented in native code that has access to operating system commands, the shell command can be executed by the threat detection client 151 rather than by the threat detection runtime environment 153. The threat detection client 151 can return a result of the shell command to the event handler as an event. The event handler can detect if the client device 106 is considered compromised based upon the event received from the threat detection client 151. The event handler can ignore a result of the shell command that indicates that the device is not compromised.

At step 213, the threat detection client 151 can generate an event that is provided to the registered event handlers that correspond to threat detection rules 125. The event can be generated in response to a shell command executed on the client device 106 by the threat detection client 151. The shell command can be executed in response to a command from the threat detection runtime 153. An example shell command \ is a command to check for a particular string. In this scenario, the presence of a regular expression in the response to the shell command can indicate a compromised device. The shell command can check for read, write, or owner permissions of one or more files. If a file has an unexpected permission, the event handler can detect a compromised device. Another example of a shell command checks for the existence of a particular file on the client device 106. Another example of a shell command checks for whether a root user account exists on the client device 106.

At step 215, after receiving an event from the threat detection client 151, the threat detection runtime environment 153 can evaluate the event against the threat detection rules 125 to determine whether the device is compromised. For example, an event handler listens for responses to a shell command. The event handler can determine, based upon the definition of the rule in the threat detection rules 125, whether the response indicates that the client device 106 is compromised.

At step 216, the threat detection runtime environment 153 can transmit a notification that the device is compromised to the threat detection service 121, the management component 131, or management service 115. In some instances, the threat detection service 121 can take action in response to notification of the compromised device automatically by consulting a rules engine. In other instances, a remedial action can be taken by an administrative user.

At step 217, the threat detection runtime environment 153 can instruct the threat detection client 151 to perform a remedial action. The threat detection rule 125 corresponding to the detected condition can specify a remedial action. A remedial action can involve disabling access to the client application 133 in which the threat detection client 151 and threat detection runtime environment 153 are running. The client application 133 can be instrumented to disable access to its features if the threat detection runtime environment 153 reports a compromised state to the threat detection client 151. By disabling applications on an application-by-application basis, some applications can continue to execute even when the device is compromised, whereas other applications can be disabled.

The remedial action can also involve other types of measures. For example, the remedial action could involve generating a warning message for a user in a notification on the client device 106 that a compromised condition exists on the client device 106. In another scenario, the remedial action could involve logging the compromised condition in a log file. In some instances, a remedial action can originate from or be taken by the threat detection service 121. In other instances, a remedial action can be initiated remotely by an administrator after receiving a notification about a detected compromised condition.

Figure 3:
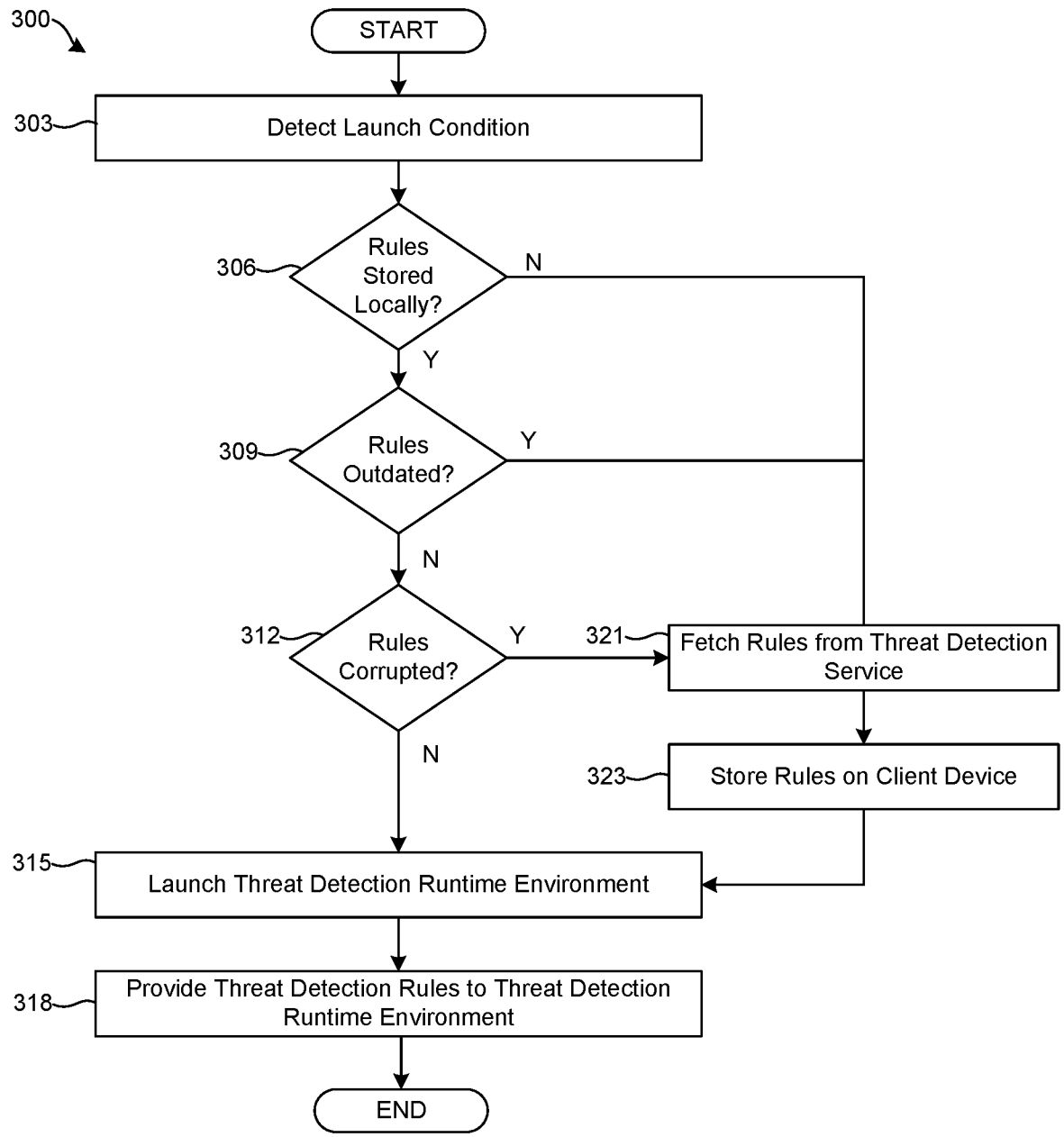
FIG. 3 is a flowchart illustrating functionality implemented by components of the networked environment.

Referring next to FIG. 3, shown is a flowchart 300 that provides one example of the operation of a portion of the computing environment 103. The flowchart 300 can be viewed as depicting an example of elements of a method implemented by the threat detection client 151 according to various embodiments of the disclosure. The method can be implemented within a client application 133, management component 131, or any other component in which the threat detection client 151 can be executed. The separation or segmentation of functionality as discussed herein is presented for illustrative purposes only.

Beginning with step 303, the threat detection client 151 can detect a launch condition that specifies when threat detection rules should be evaluated by the threat detection runtime environment 153. A launch even can include detecting foregrounding of a client application 133 in which the threat detection client 151 is implemented. Foregrounding of the application can occur when the application is launched, awoken from a sleep state, or otherwise foregrounded by the operating system. In some mobile operating systems, background execution time of an application can be limited, so the threat detection client 151 can be limited to running only when an application is foregrounded or given background execution permissions by the operating system. In some implementations, the threat detection client 151 can launch upon expiration of a timer, occurrence of an event in the operating system, or any other trigger point that can be defined by the threat detection rules 125 or instrumented within the threat detection client 151.

In step 306, the threat detection client 151 can determine whether threat detection rules 125 are stored locally on the client device 106. If the client application 133 has been launched for the first time after installation and there are no threat detection rules 125 stored on the client device, the process can proceed to step 321. Otherwise, if threat detection rules 125 are already stored on the client device 106 in storage accessible to the threat detection client 151, the process can proceed to step 309.

At step 309, if there are already threat detection rules 125 stored on the client device 106, the threat detection client 151 can determine whether the rules require updating. In one example, the threat detection client 151 can transmit a request to the threat detection service 121 along with an identifier or timestamp of the locally stored threat detection rules 125. If the locally stored threat detection rules 125 are out of date or require updating for some other reason, the threat detection service 121 can respond to the request with an updated set of threat detection rules 125 or an indication that the threat detection client 151 should update the locally stored threat detection rules 125. In some instances, the threat detection client 151 can determine that the threat detection rules 125 require updating without first consulting the threat detection service 121. The threat detection client 151 can determine based upon a timestamp that if the threat detection rules 125 are older than a threshold age, updated threat detection rules 125 should be requested from the threat detection client 121. If the threat detection rules 125 require updating, the process can proceed to step 321. If the threat detection rules 125 do not require updating, the process can proceed to step 312.

At step 312, the threat detection client 151 can determine whether the threat detection rules 125 stored locally are corrupted or otherwise compromised. The threat detection client 151 can validate the locally stored threat detection rules 125 by computing a hash code using a hash function or validating a signature of the threat detection rules 125. If the threat detection rules 125 are not corrupted, the process can proceed to step 315. If the threat detection rules 125 are corrupted, the process can proceed to step 321.

At step 321, the threat detection client 151 can fetch threat detection rules 125 from the threat detection service. In some implementations, as a part of the retrieval process, the threat detection client 151 can validate the retrieved threat detection rules 125. The threat detection rules 125 can be validated by confirming a signature or decrypting the threat detection rules 125 using a certificate or encryption key. Because the threat detection rules 125 can be implemented in an interpreted language such as JavaScript or WebAssembly, the rules can be updated without needing to update the client application 133 in which the threat detection client 151 is implemented.

At step 323, the threat detection client 151 can store the threat detection rules 125 on the client device 106. The threat detection rules 125 can be stored in the data store 163 that is accessible to the client application 133 in which the threat detection client 151 is running. Next, the process can proceed to step 315.

At step 315, the threat detection client 151 can launch the threat detection runtime environment 153. The threat detection runtime environment 153 can enforce the threat detection rules 125 that are obtained from the threat detection service 121 and stored in the data store 163.

At step 318, the threat detection client 151 can provide the threat detection rules 125 to the threat detection runtime environment 153. In one implementation, a JavaScript runtime environment can be executed with JavaScript threat detection rules 125 provided as an input to the JavaScript runtime environment. In another implementation, the threat detection runtime environment 153 can be pointed to a copy of the threat detection rules 125 stored in the data store 163. Upon executing the threat detection runtime environment 153, the process can proceed to completion.

Figure 4:
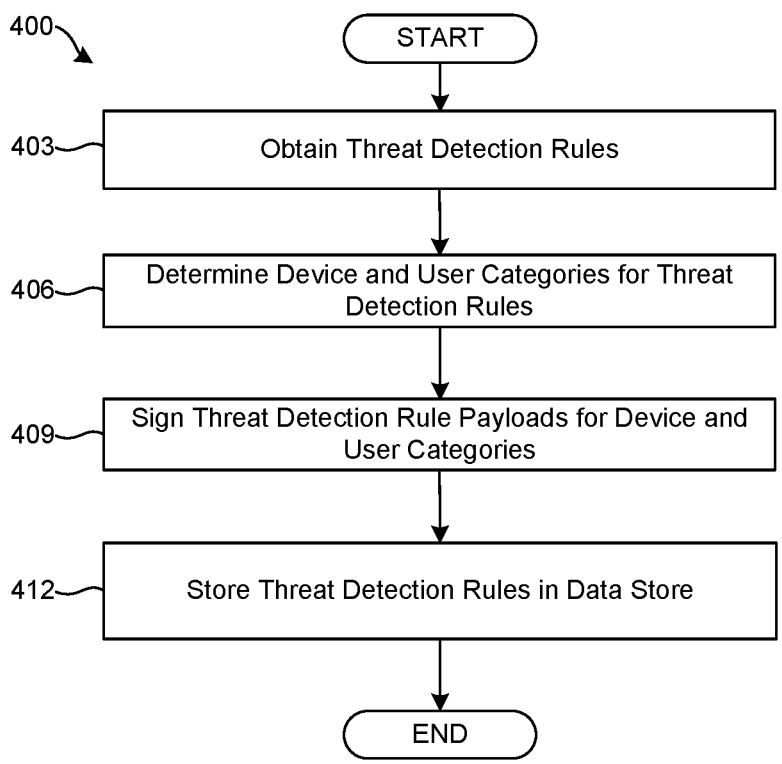
FIG. 4 is a flowchart illustrating functionality implemented by components of the networked environment.

Referring next to FIG. 4, shown is a flowchart 400 that provides one example of the operation of the threat detection service 121. The flowchart of FIG. 4 can be viewed as depicting an example of elements of a method implemented by the threat detection service 121 executed within a computing environment 103. The separation or segmentation of functionality as discussed herein is presented for illustrative purposes only.

In step 403, the threat detection service 121 can obtain threat detection rules 125 from an administrator of the management service 115 or threat detection service 121. The threat detection rules 125 can be implemented in an interpreted language such as JavaScript or WebAssembly that can be executed or interpreted by the threat detection runtime environment 153. The threat detection rules 125 can define various shell commands or other commands that can be executed on the client device 106. The commands can reveal information such as files, file properties, system properties, or user information on the client device 106 from which a determination can be made about whether the client device 106 is compromised.

The threat detection rules 125 can be obtained in a JavaScript file that is provided by an administrator to the threat detection serviced 121. The JavaScript file can define various rules that specify an event or condition in the client device 106. The event or condition specified by a rule can be associated with a compromised condition of the client device 106. The JavaScript file can also define remedial actions that the threat detection client 151 can take in response to detecting a compromised condition of the client device 106.

At step 406, the threat detection service 121 can determine one or more device or user categories for the threat detection rules 125. Threat detection rules 125 can be categorized by operating system, device manufacturer, user group, or user identifier. The categories can be embedded within tags in the threat detection rules 125 that are provided to the threat detection service 121. By categorizing the threat detection rules 125, the threat detection service 151 can provide the appropriate set of threat detection rules 125 to a client device 106 making a request over the network 109.

At step 409, the threat detection service 121 can sign the threat detection rules 125 that are provided by the administrator. The threat detection service 121 can sign the threat detection rules 125 with a certificate that the threat detection client 151 can validate. The threat detection service 121 can also encrypt the threat detection rules 125 with an encryption framework that the threat detection client 151 can utilize to decrypt and access the threat detection rules 125. Signing the threat detection rules 125 provides a mechanism for the threat detection client 151 to validate the retrieved threat detection rules 125.

At step 412, the threat detection service 121 can store the signed threat detection rules 125 to the data store 113. Thereafter, the process proceeds to completion.

The client devices 106 or devices making up the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 133 and potentially other applications. Also stored in the memory can be a data store 113 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 169 generated by the client application 133 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application, and other various systems described herein can be embodied in software or code executed by general-purpose hardware as discussed above, as an alternative, the same can also be embodied in dedicated hardware or a combination of software/general purpose hardware and dedicated hardware.

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for detecting a compromised device, comprising:
    a client device comprising at least one hardware processor; and
    program instructions executable in the client device that, when executed, direct the client device to:
        detect a launch condition associated with a threat detection runtime environment, the program instructions being embedded within the application;
        retrieve one or more rules from a remotely executed service, the rules specifying how to determine that the client device has been compromised;
        execute the threat detection runtime environment within the application;
        register an event handler within the threat detection runtime environment based upon the rules, the event handler configured to detect a condition specified by the rules indicating a compromised state; and
        detect, using the event handler, the condition by listening for a response to a command executed on the client device that is initiated by the threat detection runtime, wherein the command obtains a property of a file stored on the client device.

2. The system of claim 1, wherein the condition is detected in response to the file having at least one of a file size, a modified date, or a hash value that is different from an expected value.

3. The system of claim 1, wherein the condition is detected in response to a system property having a value specified by the rules, wherein the shell command returns a value of the system property to the event handler.

4. The system of claim 1, wherein the program instructions are embedded within a software development kit (SDK) used to generate the application.

5. The system of claim 1, wherein rules are defined in a JavaScript file or a WebAssembly file that is interpreted by the threat detection runtime environment.

6. The system of claim 1, wherein the program instructions direct the client device to take a remedial action in response to detection of the condition corresponding to the compromised condition, the remedial action comprising at least one of: generating a notification user interface element, reporting the condition to a remotely executed management service, or blocking at least one functionality of the application.

7. A non-transitory computer-readable medium for detecting a compromised device embodying program instructions executable in a client device that, when executed by the client device, direct the client device to:
    detect a launch condition associated with a threat detection runtime environment, the program instructions being embedded within the application, the program instructions being embedded within the application;
    retrieve one or more rules from a remotely executed service, the rules specifying how to determine that the client device has been compromised;
    execute the threat detection runtime environment within the application;
    register an event handler within the threat detection runtime environment based upon the rules, the event handler configured to detect a condition specified by the rules indicating a compromised state; and
    detect, using the event handler, the condition by listening for a response to a command executed on the client device that is initiated by the threat detection runtime, wherein the command obtains a property of a file stored on the client device.

8. The non-transitory computer-readable medium of claim 7, wherein the condition is detected in response to the file having at least one of a file size, a modified date, or a hash value that is different from an expected value.

9. The non-transitory computer-readable medium of claim 7, wherein the condition is detected in response to a system property having a value specified by the rules, wherein the shell command returns a value of the system property to the event handler.

10. The non-transitory computer-readable medium of claim 7, wherein the program instructions are embedded within a software development kit (SDK) used to generate the application.

11. The non-transitory computer-readable medium of claim 7, wherein the rules are defined in a JavaScript file or a WebAssembly file that is interpreted by the threat detection runtime environment.

12. The non-transitory computer-readable medium of claim 7, wherein the program instructions direct the client device to take a remedial action in response to detection of the condition corresponding to the compromised condition, the remedial action comprising at least one of: generating a notification user interface element, reporting the condition to a remotely executed management service, or blocking at least one functionality of the application.

13. A method for detecting a compromised client device, comprising:
   detecting a launch condition associated with a threat detection runtime environment, the program instructions being embedded within the application;
   retrieving one or more rules from a remotely executed service, the rules specifying how to determine that the client device has been compromised;
   executing the threat detection runtime environment within the application;
   registering an event handler within the threat detection runtime environment based upon the rules, the event handler configured to detect a condition specified by the rules indicating a compromised state; and
   detecting, using the event handler, the condition by listening for a response to a command executed on the client device that is initiated by the threat detection runtime, wherein the command obtains a property of a file stored on the client device.

14. The method of claim 13, wherein the condition is detected in response to the file having at least one of a file size, a modified date, or a hash value that is different from an expected value.

15. The method of claim 13, wherein the condition is detected in response to a system property having a value specified by the rules, wherein the shell command returns a value of the system property to the event handler.

16. The method of 13, wherein the rules are defined in a JavaScript file or a WebAssembly file that is interpreted by the threat detection runtime environment.

17. The method of claim 13, further comprising taking a remedial action in response to detection of the condition corresponding to the compromised condition, the remedial action comprising at least one of: generating a notification user interface element, reporting the condition to a remotely executed management service, or blocking at least one functionality of the application.

* * * * *